(12) United States Patent
Bostick et al.

(10) Patent No.: US 10,230,835 B2
(45) Date of Patent: *Mar. 12, 2019

(54) IN-CALL FACT-CHECKING

(71) Applicant: International Business Machines Corporation, Armonk, NY (US)

(72) Inventors: James E. Bostick, Austin, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 227 days.

This patent is subject to a terminal disclaimer.

(21) Appl. No.: 14/799,420

(22) Filed: Jul. 14, 2015

(65) Prior Publication Data

US 2017/0019529 A1    Jan. 19, 2017

(51) Int. Cl.
*H04M 1/66* (2006.01)
*H04M 3/22* (2006.01)
*H04W 12/12* (2009.01)
*H04M 3/42* (2006.01)
*G06F 17/27* (2006.01)
(Continued)

(52) U.S. Cl.
CPC ...... *H04M 3/2281* (2013.01); *G06F 17/2785* (2013.01); *G06Q 50/265* (2013.01); *H04L 63/1425* (2013.01); *H04M 3/42221* (2013.01); *H04W 12/12* (2013.01); *G10L 15/26* (2013.01); *G10L 25/48* (2013.01); *H04L 63/30* (2013.01);
(Continued)

(58) Field of Classification Search
None
See application file for complete search history.

(56) References Cited

U.S. PATENT DOCUMENTS 5,606,604 A * 2/1997 Rosenblatt .......... H04M 3/2281
340/5.74
5,805,686 A 9/1998 Moller et al.
(Continued)

FOREIGN PATENT DOCUMENTS

JP    2010161589 A    7/2010
JP    2012134647 A    7/2012

OTHER PUBLICATIONS

IBM, Method and apparatus to detect fraud registration to Web based services, Apr. 13, 2009.
(Continued)

*Primary Examiner* — Jinsong Hu
*Assistant Examiner* — Alexander J Yi
(74) *Attorney, Agent, or Firm* — Garg Law Firm, PLLC; Rakesh Garg; Christopher K. McLane (57) ABSTRACT

In a method for verifying statements during a call that uses a telecommunication device, a statement made during the call is detected at the telecommunication device. The statement forms an in-call fact statement. Data of a portion of the call is saved, where the portion is related to the statement. The part of the statement is asserted as being true in the statement. A result of a verification of a part of the statement is received. The result is evaluated to determine that the part of the statement is false. In response to the evaluating, the processor in the telecommunication device, is used to cause a change to occur in the call.

23 Claims, 5 Drawing Sheets

(51) Int. Cl.
*G06Q 50/26* (2012.01)
*H04L 29/06* (2006.01)
*G10L 15/26* (2006.01)
*G10L 25/48* (2013.01)

(52) U.S. Cl.
CPC ............. *H04M 2201/40* (2013.01); *H04M 2203/6027* (2013.01)

(56) References Cited

U.S. PATENT DOCUMENTS

| | | | | |
|---|---|---|---|---|
| 6,535,727 B1 * | 3/2003 | Abbasi | ............ | H04M 15/00 379/114.2 |
| 6,542,729 B1 * | 4/2003 | Chmaytelli | ............ | H04W 12/12 379/114.14 |
| 6,633,633 B1 * | 10/2003 | Bedingfield | ............ | H04M 3/42 379/201.11 |
| 7,457,404 B1 * | 11/2008 | Hession | ............ | G10L 15/26 379/265.07 |
| 8,185,448 B1 | 5/2012 | Myslinski | | |
| 8,229,795 B1 | 7/2012 | Myslinski | | |
| 8,458,046 B2 | 6/2013 | Myslinski | | |
| 2004/0122846 A1 | 6/2004 | Chess et al. | | |
| 2006/0287970 A1 | 12/2006 | Chess et al. | | |
| 2010/0066830 A1 * | 3/2010 | DeKeyser | ............ | H04N 7/18 348/143 |
| 2011/0010173 A1 * | 1/2011 | Scott | ............ | H04M 3/42221 704/235 |
| 2012/0078826 A1 | 3/2012 | Ferrucci et al. | | |
| 2012/0287823 A1 | 11/2012 | Lin | | |
| 2013/0060860 A1 * | 3/2013 | Myslinski | ............ | G06Q 10/10 709/204 |
| 2013/0197912 A1 * | 8/2013 | Hayakawa | ............ | G10L 17/005 704/246 |
| 2013/0275355 A1 | 10/2013 | Miltonberger | | |
| 2014/0370850 A1 * | 12/2014 | Meacham | ............ | H04L 63/1416 455/410 |
| 2015/0195406 A1 * | 7/2015 | Dwyer | ............ | H04M 3/5175 379/265.07 |
| 2016/0078512 A1 * | 3/2016 | Yopp | ............ | G06Q 30/0613 705/26.41 |

OTHER PUBLICATIONS

Anonymous, Phishing detection and prevention, Jun. 13, 2012.
Wikipedia, Data analysis techniques for fraud detection, http://en.wikipedia.org/wiki/Data_analysis_techniques_for_fraud_detection, Sep. 14, 2014.
Wikipedia, Phone Fraud, http://en.wikipedia.org/wiki/Phone_fraud, Nov. 2, 2014.
Wikipedia, TelemarketingFraud, http://en.wikipedia.org/wiki/Telemarketing_fraud, Aug. 19, 2014.
Appendix P, Jul. 14, 2015.

* cited by examiner

IN-CALL FACT-CHECKING

TECHNICAL FIELD

The present invention relates generally to a method, system, and computer program product for reducing phone fraud. More particularly, the present invention relates to a method, system, and computer program product for in-call fact-checking.

BACKGROUND

Undesirable phone calls (hereinafter referred to as "call" or "calls") are a common experience for many users. While some calls can be undesirable simply for being annoying, other calls can be undesirable due to their potential to cause harm to persons or property.

For example, a telemarketing phone call is annoying in most cases due to the insistent manner in which the caller seeks to sell something. A call to offer fraudulent sale of securities or real estate can cause serious damage to a person's finances. As another example, a fraudulent call to misinform a user about their credit and commit identity theft has the potential to cause harm to the user's person and property.

Many phone service providers and call-related applications attempt to block undesirable calls using one or more lists of phone numbers. The lists are often referred to as blacklists, and include phone numbers from which undesirable calls are known to originate.

When a user is using a blacklist and receives an undesirable call, a caller identifier (caller ID) identifies the phone number associated with the undesirable call. If the phone number exists in the blacklist, the blacklist prevents the call from ringing the phone, disconnects the undesirable call, sends the undesirable call to voicemail, plays a pre-recorded message to the caller, or some combination thereof.

Natural language processing (NLP) is a technique that facilitates exchange of information between humans and data processing systems. For example, one branch of NLP pertains to transforming human readable content into machine usable data. For example, NLP engines are presently usable to accept human readable input content such as a newspaper article or a whitepaper, and produce structured data, such as an outline of the input content, most significant and least significant parts, a subject, a reference, dependencies within the content, and the like, from the given content.

The input information for NLP can be sourced from any number of data sources. Generally, the input information can take any human-readable form and can include any type of content, including but not limited to text in a language, numerical data, conversational or unstructured information, structured data, and the like.

SUMMARY

The illustrative embodiments provide a method, system, and computer program product for in-call fact-checking. An embodiment includes a method for verifying statements during a call that uses a telecommunication device. The embodiment detects, at the telecommunication device, using a processor in the telecommunication device, a statement made during the call, the statement forming an in-call fact statement. The embodiment saves data of a portion of the call, wherein the portion is related to the statement. The embodiment receives a result of a verification of a part of the statement, wherein the part of the statement is asserted as being true in the statement. The embodiment evaluates the result to determine that the part of the statement is false. The embodiment causes, responsive to the evaluating, using the processor in the telecommunication device, a change to occur in the call.

Another embodiment includes a computer program product for verifying statements during a call that uses a telecommunication device, the computer program product comprising one or more computer-readable storage devices, and program instructions stored on at least one of the one or more storage devices.

Another embodiment includes a computer system for verifying statements during a call that uses a telecommunication device, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Within the scope of the illustrative embodiments, a device used for making or receiving a call comprises a telephony subsystem that is capable of initiating a call, receiving a call, or both. A call, whether inbound to the device or outbound from the device, is logged in a call log.

The call data presently logged for inbound calls comprises the caller's phone number, an identity of the caller if available locally at the device or remotely from the caller or the service provider, and duration of the call. In some cases, a status indicator in the call log indicates whether the call succeeded, failed, or was diverted. Similarly, the call data presently logged for outbound calls comprises the called party's phone number, an identity of the called party if available locally at the device or remotely from the service provider, and duration of the call. In some cases, a status indicator in the call log indicates whether the call succeeded or failed.

The illustrative embodiments recognize that presently available methods for controlling or avoiding undesirable calls are limited in capabilities and suffer from several disadvantages. For example, the blacklist of undesirable caller numbers is often published by an entity, such as a blacklist application ("app") vendor, and the user can often not modify the list. The user-initiated modifications to a blacklist are limited to adding a phone number, an action to perform when a call is received from that number.

As another example, a blacklist only monitors or filters inbound calls. In some cases, a user may inadvertently, or due to perpetration of a fraud on the user, may call a phone number. Presently available blacklists and other similar methods, such as websites of users' comments about undesirable calls, are ineffective in preventing outbound calls to numbers associated with undesirable activities.

The illustrative embodiments recognize that a user often cannot determine a nature of harm or fraud possible just by accepting a call from a number or just making a call to a number. Usually, the undesirable actions do not occur until some a conversation has been initiated and is ongoing during the call (in-call). In other words, perpetration of fraud, misinformation, deceit, or similar undesirable activity usually occurs when the user is in-call.

The illustrative embodiments recognize that the presently available methods of screening undesirable callers are often useful only in a post-facto manner, after the user has already suffered the annoyance or harm from an undesirable call. Therefore, a system and method for detecting undesirable activities or inaccurate representations occurring during an ongoing call is needed.

The inventors are unaware of any general recognition of these problems by fellow practitioners. The illustrative embodiments used to describe the invention generally address and solve the above-described problems and other problems related to limiting a user's exposure to in-call undesirable activities. The illustrative embodiments provide a method, system, and computer program product for in-call fact-checking.

An embodiment detects a fact statement made during a conversation. Generally, a fact statement take the form of an assertion made by the caller, such as stating "I am John Doe", "I am calling from ABC business", "I am calling about your Visa account", "this stock is going to rise", "you owe two thousand dollars", "you have won xyz prize (or lottery, inheritance, etc.)", and the like. In other words, the person making the statement appears to be making a statement of an alleged fact.

These statements are detectable in written or spoken content by their grammatical construct of the form that is present in the above examples in English language. Generally, a fact statement can be detected by identifying, in a statement, the presence of a defined grammatical construct according to the language of the conversation, and the presence of one or more keywords in that statement. As some non-limiting examples, an embodiment can be configured to detect statements that include financial terminology, words used to verify the identity of a person, words referring to a location or an institution, and the like.

The embodiment, upon detecting an in-call fact statement initiates a capture of a call segment. A call segment is a portion of the conversation occurring in-call when the fact statement is made. In one embodiment, the conversation may be recorded on a loop such that it is possible to review and save a portion of the conversation that has already transpired. In such an embodiment, the capture can begin at a time prior to the time when the fact statement was made. Such an embodiment can also begin the capture at the time when the fact statement was made.

The capture can last for a configurable duration. For example, the capture can end when the fact statement ends, a period after the fact statement ends, or can be ongoing until the user or an event ends the capture. An embodiment pre-processes the data captured from the call segment. For example, the embodiment may compress, encode, or encrypt the data.

Some other non-limiting examples of the pre-processing include filtering, redacting, or masking the data to remove certain portions of the data. Such pre-processing is particularly helpful if the data includes account numbers, identity information, and other sensitive information. For example, in a segment captured from a voice call, a person may say an account number. Similarly, in a segment captured from a video call, a screen may show an account balance, a login information, and the like. The pre-processing is configurable, such as to perform certain types of compression or encryption, to redact certain information, or to allow certain information to pass unfiltered, on call segments containing certain types of information.

These examples of manners of identifying a fact statement, capturing a call segment, and pre-processing the captured data are not intended to be limiting. From this disclosure, those of ordinary skill in the art will be able to conceive many other manners for similar operations and the same are contemplated within the scope of the illustrative embodiments.

The embodiment sends the captured and pre-processed call segment data for fact-checking. Fact-checking is a process of verifying the accuracy or validity of the fact statement by using information from a third-party, i.e., by using information from a source other than the caller or the called party. In one embodiment, the fact-checking operation is performed at the device used to receive the call and where the call segment is captured. In another embodiment, the fact-checking operation is performed off-device, to wit, in a data processing system separate and distinct from the device but accessible from the device over a data network.

An embodiment receives a result of the fact-checking operation. The result may indicate that the fact statement is accurate and correct, or invalid, unreliable, or inaccurate. Furthermore, the result may also indicate a degree of confidence in that determination. For example, the result may indicate that the fact statement in the captured call segment is accurate with a sixty percent confidence given the third-party information used to validate that data. Similarly, the result may indicate that the fact statement in the captured call segment is inaccurate with a eighty percent confidence given the third-party information used to validate that data.

If the result indicates that the fact statement is invalid, unreliable, inaccurate, the embodiment applies the result to the call, while the call is in progress. For example, if the fact statement in the captured call segment is inaccurate, unreliable, or incorrect with a greater than a threshold level of confidence, the embodiment takes as action with respect to the call. Some non-limiting examples of possible actions while the call is in-progress include, but are not limited to, terminating the call, putting the call on hold so that the user can review the results and take an action, notify the user via an audible or visual or haptic user interface, or notify a third-party such as law enforcement personnel.

An embodiment begins and ends a call segment capture, creating a discrete capture. The embodiment pre-process the discretely captured data (discrete data), and perform fact-checking on that discrete data. Another embodiment begins a call segment capture, continues capturing ongoing call data as a data stream. The embodiment pre-processes the data stream and performs the fact-checking by streaming the pre-processed data. An embodiment can capture and fact-check any number of call segments of any length, from any in-call point in time.

Another embodiment performs the fact-checking operation. The embodiment receives the captured and pre-processed call segment data. The embodiment pre-processes the received data, such as by decompressing, decrypting, or decoding the received data.

The data can include text, sound, graphical, or video information. The embodiment applies different methods to convert the various types of information into a form suitable for fact extraction. For example, for video data, the embodiment performs sentiment analysis, facial expression analysis, or applies forensics or other known techniques to extract the fact statement, and other emotion or sentiment facts to assist in determining whether the statement is a truth. E.g., a speaker's body language may indicate that the speaker is lying, without needing to verify the statement with third-party information.

As another example, for image data, the embodiment performs image analysis to identify graphically represented facts to form the fact statement. For example, a chart or graph in the image can be transformed into a textual statement, which can then be fact-checked using third-party information.

As another example, for speech or voice data, the embodiment performs speech-to-text conversion to transform orally represented facts into a textual fact statement. The textual statement can then be fact-checked using third-party information. Voice facts, such as timber or pitch of the voice can sometimes assist in verification of a statement. In some cases, the received data may already contain the fact statement in text form.

Once the fact statement is available in textual form, the embodiment performs NLP to extract the fact—fact values—that can be tested for validity. For example, if the textual statement is "I am John Doe", the fact values to be verified can be the name John Doe, the number from which the caller is calling, and the association between the name John Doe and the number. These fact values can be verified, for example, using a third-party phone directory.

As another example, if the textual statement is "I am calling from ABC business", the fact values to be verified can be the caller's number, the entity ABC business, and the association between the caller's number and the entity ABC business. These fact values can be verified, for example, using the company directory of ABC business.

As another example, if the textual statement is "I am calling about your Visa account", the fact values to be verified can be the called user's name, the account type or identifier, and the association between the name and the account type or identifier. These fact values can be verified, for example, using a financial or credit information database.

As another example, if the textual statement is "this stock is going to rise", the fact values to be verified can be the called stock ticker and an upward trend information. These fact values can be verified, for example, using a financial or news information database.

Other examples of textual statements, such as, "you owe two thousand dollars", "you have won xyz prize (or lottery, inheritance, etc.)", and the like, can similarly be broken down into fact values using NLP and fact-checked using appropriate information sources. These example fact extractions and verifications are not intended to be limiting. From this disclosure, those of ordinary skill in the art will be able to conceive many other ways of using NLP to perform similar operations and the same are contemplated within the scope of the illustrative embodiments.

An embodiment produces a fact-checking result in this manner. An embodiment further assigns a confidence value to a fact-checking result. In one embodiment, a confidence value is proportional to a degree of match between a fact value and information from a third-party. In another embodiment, a reliability of the conversion and/or extraction of a fact value are also a component of the confidence value of a result. These examples of ways of establishing a confidence value in fact-checking are not intended to be limiting. From this disclosure, those of ordinary skill in the art will be able to conceive many other ways of expressing confidence in the fact-checking results and the same are contemplated within the scope of the illustrative embodiments.

The fact-checking results, with or without confidence values, are used by an embodiment to take an action during a call that is in progress, as described elsewhere in this disclosure.

A method of an embodiment described herein, when implemented to execute on a device or data processing system, comprises substantial advancement of the functionality of that device or data processing system in preventing or reducing undesirable in-call activities. For example, prior-art organization hierarchy is unable to detect in-call fact statements or perform in-call fact verification. The embodiments continuously and automatically monitor an in-call conversation to detect a fact statement and perform on-the-fly fact verification. Operating in a manner described herein, an embodiment to take suitable precautionary or preventative in-call actions. Such manner of in-call fact-checking is unavailable in presently available devices or data processing systems. Thus, a substantial advancement of such devices or data processing systems by executing a method of an embodiment allows a telephonic device to be operated in a manner that reduces or prevents the perpetration of telephone fraud and other undesirable activities.

The illustrative embodiments are described with respect to certain calls, fact statements, segments, timings, pre-processing, data types, extracted facts, information sources, actions, confidence values, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
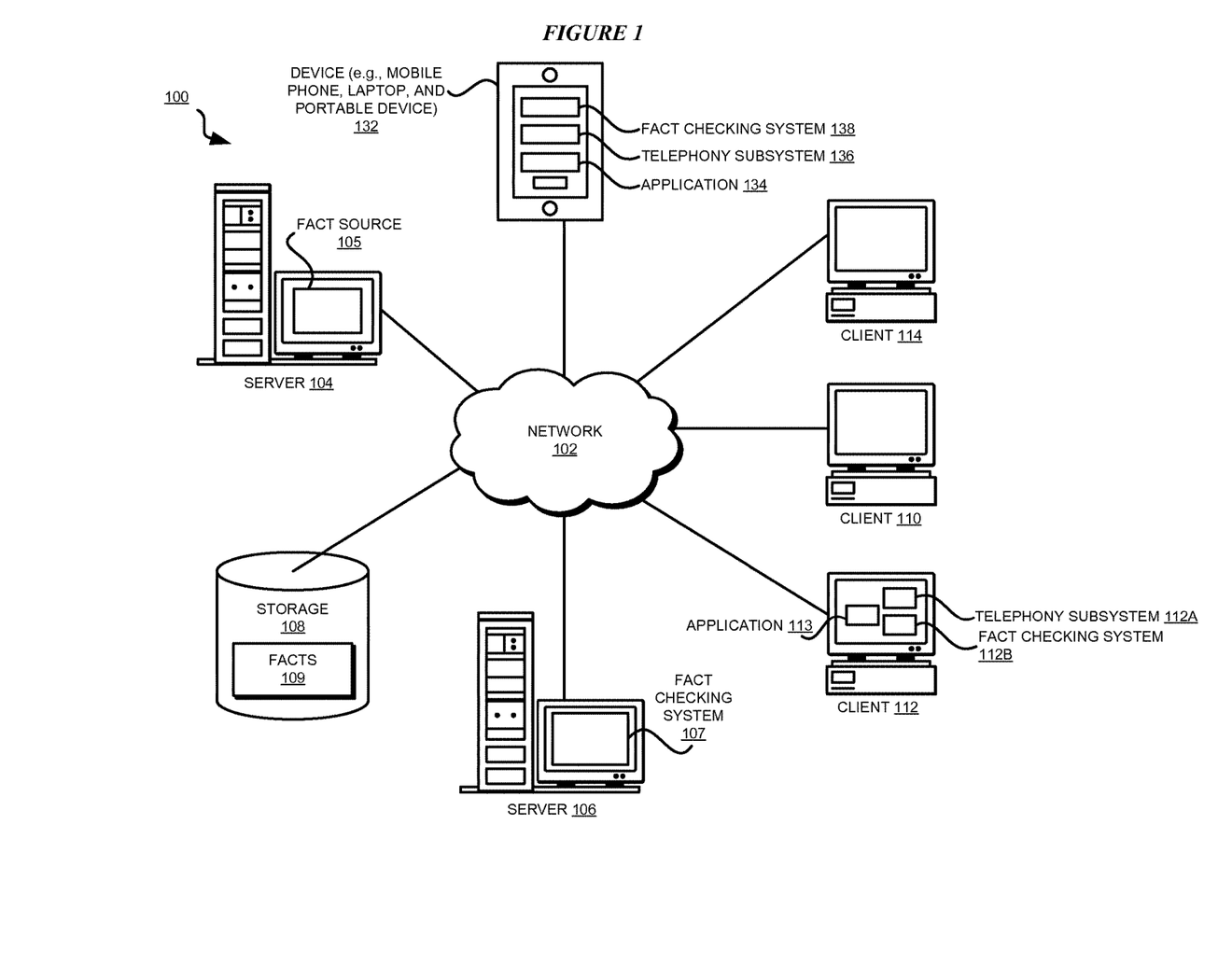
FIG. 1 depicts a block diagram of a network of data processing systems in which illustrative embodiments may be implemented.
Figure 2:
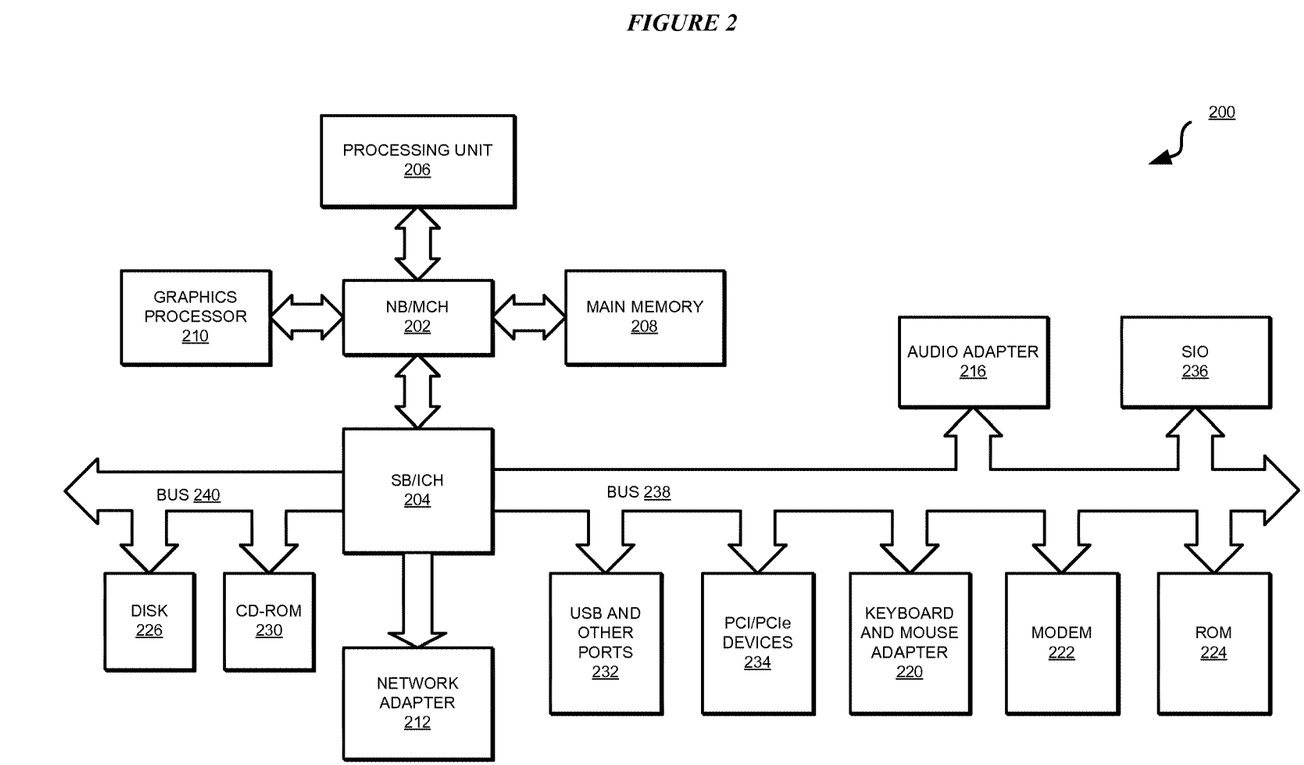
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 can be configured for initiating or receiving a call, such as by using telephony subsystem 136. As an example, telephony subsystem 136 may be a combination of hardware and software to make calls over a phone service provider's network. Application 134 implements an embodiment, and operates in conjunction with telephony subsystem 136, as described herein. Client 112 may be another device or data processing system used by a social contact of the user of device 132. For example, client 112 may be configured with telephony subsystem 112A, e.g., a Voice over Internet Protocol (VoIP) application to make calls over a data network. Application 113 implements an embodiment described herein, and operates in conjunction with telephony subsystem 112A. Fact-checking system 138 implements an in-device fact-checking operation in device 132, as described herein. Fact-checking system 112B also implements an in-device fact-checking operation in client 112 in a similar manner. Fact-checking system 107 implements an off-device fact-checking operation available to device 132 or client 112 over network 102, as described herein. Fact source 105 may be any suitable source of factual information, from which fact-checking system 138, 112B, or 107 may collect information to verify a stated fact. As some non-limiting examples, fact source 105 may be a web server, a server associated with a social networking site or social media site, or a data processing system of a news organization, a financial institution, or another organization. Generally, facts 109 may be any type or number of factual information, stored in any type or number of repositories using any type or number of storage 108 external to device 132, and usable as a fact source.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 113 or 134, or fact-checking system 107, 112B, or 138 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
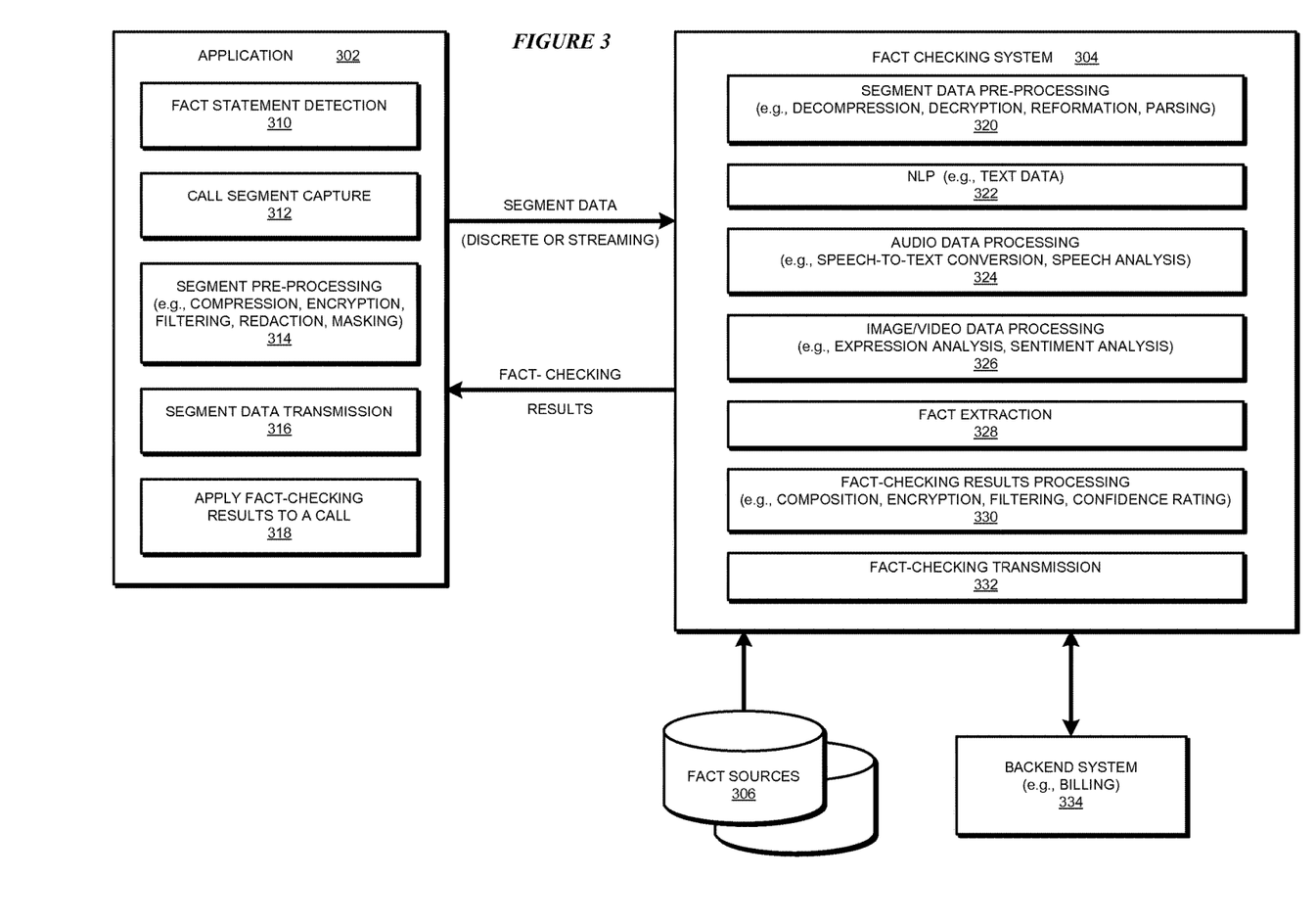
FIG. 3 depicts a block diagram of an example configuration for in-call fact-checking in accordance with an illustrative embodiment.

With reference to FIG. 3, this figure depicts a block diagram of an example configuration for in-call fact-checking in accordance with an illustrative embodiment. Application 302 is an example of application 113 or 134 in FIG.

1. Fact-checking system 304 is an example of fact-checking system 107, 112B, or 138 in FIG. 1. When application 302 and fact checking system 304 are implemented in the same device, such as in device 132 in FIG. 1, application 302 and fact checking system 304 can execute in the device as separate application or a single application. When application 302 and fact checking system 304 are implemented in different systems, such as with application 302 executing in device 132 in FIG. 1 and fact-checking system 304 executing in server 106 in FIG. 1, application 302 accesses fact checking system 304 over a data network, such as over network 102 in FIG. 1. Fact sources 306 can include any combination of example fact sources such as fact source 105, repository 108, or both.

Application 302 includes component 310, which detects an in-call fact statement made by one of the parties in the call, preferably a caller party, during an ongoing call. Component 312 begins and ends a discrete capture or a streaming capture as described elsewhere in this disclosure.

Component 314 performs any pre-processing to the data of the captures call segment. The pre-processing is configured in a configuration (not shown) associated with application 302. As described elsewhere in this disclosure, data compression, encryption, encoding, filtering, redaction, and masking are some non-limiting examples the pre-processing that can be configured for component 314.

Component 316 sends, passes, or transmits the pre-processed segment data to fact-checking system 304. Component 318 applies the fact-checking results returned from or received from fact-checking system 304, as described elsewhere in this disclosure.

Fact-checking system 304 includes component 320, which receives the discrete or streaming segment data, as the case may be, from application 302. Component 320 performs pre-processing of the received data. As described elsewhere in this disclosure, data decompression, decryption, and decoding are some non-limiting examples the pre-processing that can be configured for performance in component 320.

Component 322 performs NLP, or uses an NLP engine to perform NLP, on textual data. The textual data may be present in the received data, such as after the pre-processing by component 320.

If the received data includes audio data, component 324 performs audio data analysis, such as to perform speech-to-text conversion, speech analysis, and the like, to extract textual data and optionally one or more sound-based assistive facts as described elsewhere in this disclosure. Component 322 then performs NLP on the text data.

If the received data includes graphical or video data, component 326 performs image or video data analysis, such as to perform image-to-text conversion, image analysis, expression analysis, sentiment analysis, and the like, to extract textual data and optionally one or more image or video-based assistive facts as described elsewhere in this disclosure. Component 322 then performs NLP on the text data.

NLP operation of component 322 returns the fact statements from the textual data in a form that enables facts extraction. Component 328 extracts the facts, or fact values, from the fact statements.

Component 330 performs fact-checking, such as by using information from one or more fact sources 306. Component 330 further performs processing of the results of the fact-checking. For example, component 330 may compress, encrypt, encode, or filter a result. As another example, component 330 may compute and apply a confidence value to the result as described herein.

Component 332 sends, passes, or transmits the processed fact-checking results to application 302. In one embodiment, component 332 also passes one or more of the received data, the extracted facts, fact sources used, fact-checking results produced, or some combination thereof to backend system 334. As an example, backend system 334 may be a billing system of a service provider, who provides one or more services to the device where application 302 is executing, a user associated with that device. The service provider provides fact-checking as a billable service, and information passed by component 332 to backend system 334 is usable for billing for the service.

Figure 4:
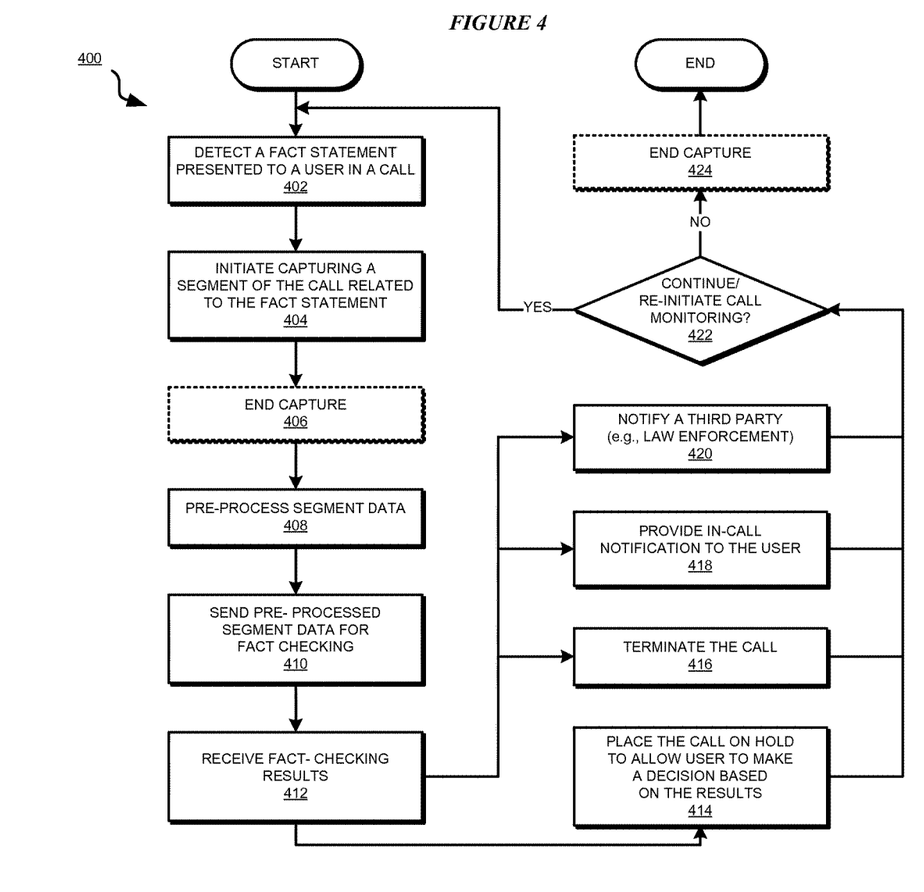
FIG. 4 depicts a flowchart of an example process for in-call fact-checking in accordance with an illustrative embodiment.

With reference to FIG. 4, this figure depicts a flowchart of an example process for in-call fact-checking in accordance with an illustrative embodiment. Process 400 can be implemented in application 302 in FIG. 3.

The application detects a fact statement, where the fact statement is presented in-call to a user, such as by an audio conversation or message, an image display, a video display, or a combination thereof (block 402). The application initiates the capturing of a call segment that is related to the fact statement (block 404). A call segment is related to a fact statement by including the fact statement, preceding the fact statement, succeeding the fact statement, or some combination thereof.

When the application is capturing a discrete segment, the application optionally ends the call segment capture (block 406). When the application is capturing a streaming segment, or when an automatic ending of the capture is configured, or when the capturing is terminated by an event in the device, the application omits block 406.

Depending on the capture process used, the application pre-processes the discrete or streaming data—as the case may be—captured in the call segment (block 408). The application sends the pre-processed segment data for fact-checking (block 410).

The application receives the fact-checking results (block 412). The application takes one or more actions based on the results.

For example, as one non-limiting action alternative, the application places the ongoing call on hold, to present the results to the user and allow the user to make a decision about the call based on the results (block 414). For example, the application places the call on hold and audibly announces or visibly displays the results to the user.

As another non-limiting example action alternative, the application terminates the ongoing call (block 416). For example, the application determines that the confidence value of the result exceeds a threshold, or the results indicate a likelihood of harm exceeding a threshold if the call continues, and automatically terminates the call on behalf to the user.

As another non-limiting example action alternative, the application provides the results to the user in an in-call announcement that is audible only to the user and not to the other party or parties in the call (block 418). For example, the audibly announces or visibly displays the results to the user.

As another non-limiting example action alternative, the application notifies a third-party, such as law enforcement (block 420). For example, if the application determines that the results indicate that the caller or the call has violated the law, the application may notify the appropriate law enforcement agency on behalf to the user. The application can take more than one of the alternative actions of blocks 414, 416, 418, and 420.

The application determines whether to continue the call monitoring, or to reinitiate the call monitoring (block 422). For example, call monitoring to detect fact statements can be continuous during a call, or may be terminated when a capture is terminates. In such cases, if the call continues past the end of the segment capture, the call monitoring—and thereby additional fact statement detections and call segment captures—may have to be reinitiated in block 422.

If the call monitoring is to continue or has to be reinitiated ("Yes" path of block 422), the application returns process 400 to block 402. If the call monitoring is not to be continued or reinitiated ("No" path of block 422), the application optionally ends an ongoing streaming capture, if a streaming capture is ongoing (block 424). The application ends process 400 thereafter.

Figure 5:
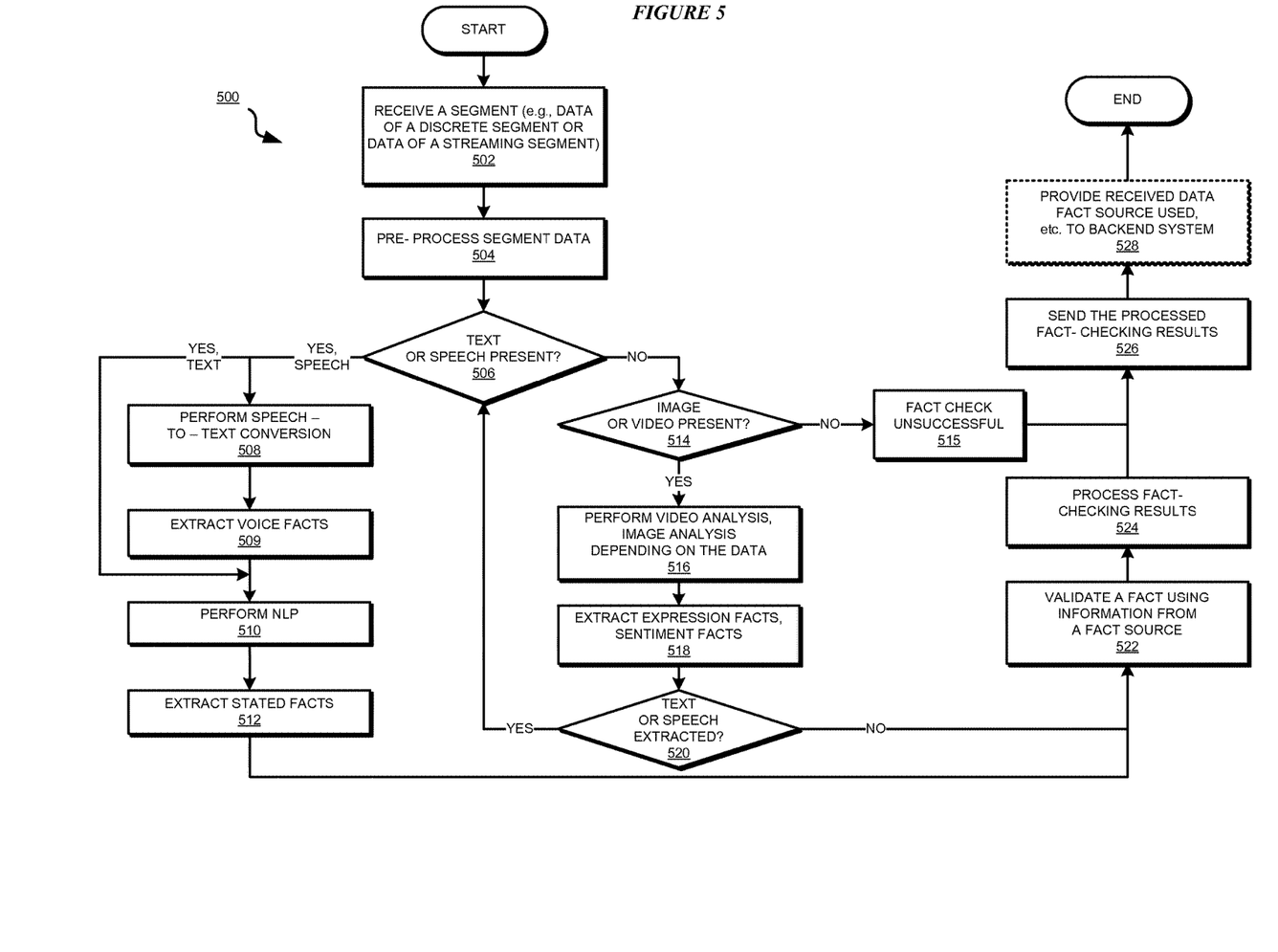
FIG. 5 depicts a flowchart of an example process for in-call fact-checking in accordance with an illustrative embodiment.

With reference to FIG. 5, this figure depicts a flowchart of an example process for in-call fact-checking in accordance with an illustrative embodiment. Process 500 can be implemented in fact-checking system 304 in FIG. 3.

The system receives the data of a call segment (block 502). The system pre-processes the received data (block 504).

The system determines whether text or speech is present in the received data (block 506). If speech data is present ("Yes, speech" path of block 506), the system performs speech-to-text conversion (block 508). The system extracts any voice facts, as may be available in the processed speech data (block 509).

The system performs NLP using the converted text (block 510). If text data is present ("Yes, text" path of block 506), the system performs NLP using the text in block 510.

The system extracts the stated facts, i.e., the fact values, from the fact statements produced by the NLP operation of block 510 (block 512). The system causes process 500 to proceed to block 522 thereafter.

If text or speech data is not present, such as when speech not present at all or is mixed with video, or when text is not present at all or may be embedded in images ("No" path of block 506), the system determines whether image or video data is present in the received data (block 514). If image or video data is not present in the received data ("No" path of block 514), the system concludes that the fact-checking operation on the received data has been unsuccessful (block 515). The system causes process 500 to proceed to block 526 thereafter.

If image or video data is present in the received data ("Yes" path of block 514), the system performs image analysis, video analysis, or a combination thereof, depending upon the received data (block 516). The system extracts any expression facts, sentiment facts, or some combination thereof, as may be available in the processed image or video data (block 518).

The application determines whether any text or speech data was extracted as a result of the image or video processing (block 520). If text or speech data was extracted ("Yes" path of block 520), the system returns process 500 to block 506.

If text or speech data was not extracted ("No" path of block 520), the system validates the facts that were extracted in blocks 509, 512, 518, or some combination thereof, using information from a fact source (block 522). The system processes the results of the fact-checking (block 524). The system sends the processed fact-checking results, such as to block 412 in process 400 (block 526).

Optionally, the system provides the information about the received data, fact sources used, and so on, to a backend system (block 528). The system ends process 500 thereafter.

Thus, a computer implemented method, system or apparatus, and computer program product are provided in the illustrative embodiments for in-call fact-checking. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for verifying statements during a call that uses a telecommunication device, the method comprising:
   detecting, at the telecommunication device, using a processor in the telecommunication device, a statement made during the call, the statement forming an in-call fact statement;
   saving data of a portion of the call, wherein the portion is related to the statement;
   pre-processing the data of the portion of the call, wherein the pre-processing includes one of filtering, redacting, and masking the part of the data of the portion to remove sensitive information associated with a user of the telecommunication device;
   determining, using the processor in the telecommunication device, that textual content is present in the data of the portion of the call;
   extracting, using the processor in the telecommunication device for Natural Language Processing (NLP) on the textual content, a part of the statement that is asserted as true from the pre-processed data of the portion of the call;
   receiving a result of a verification of the part of the statement;
   evaluating the result to determine that the part of the statement is false;
   determining, as a part of the evaluating, that a confidence value associated with the result is greater than a threshold;
   providing, responsive to determining that the confidence value is greater than the threshold, an in-call indication to the user of the telecommunication device that the part of the statement is false, wherein the in-call indication is an in-call announcement audible only to the user; and
   causing, responsive to the evaluating, using the processor in the telecommunication device, a change to occur in the call.

2. The method of claim 1, further comprising:
   determining, using the processor in the telecommunication device, that audio content is present in the data of the portion of the call;
   converting the audio content into text using the processor in the telecommunication device for speech processing, the textual content including the text.

3. The method of claim 2, further comprising:
   extracting, using the processor in the telecommunication device, a speech characteristic from the audio content.

4. The method of claim 1, further comprising:
   determining, using the processor in the telecommunication device, that video content is present in the data of the portion of the call;
   converting a part of the video content into text using the processor in the telecommunication device for video processing, the textual content including the text.

5. The method of claim 4, further comprising:
   extracting, using the processor in the telecommunication device for facial expression analysis, one of an expression characteristic and a sentiment characteristic from the video content.

6. The method of claim 1, further comprising:
determining, using the processor in the telecommunication device, that graphical image content is present in the data of the portion of the call;
converting a part of the graphical image content into text using the processor in the telecommunication device for image processing, the textual content including the text.

7. The method of claim 1, further comprising:
obtaining information from a data source;
determining whether the part of the statement is validated by the information; and
indicating, responsive to determining that the part of the statement is invalidated by the information, the part of the statement as false in the result.

8. The method of claim 7, further comprising:
determining, that the part of the statement matches the information below a threshold degree of match;
assigning a confidence value to the result, based on a degree of match between the part of the statement and the information, wherein the confidence value indicates that the part of the statement is false.

9. The method of claim 1, further comprising:
terminating the call as a part of causing the change in the call.

10. The method of claim 1, further comprising:
placing the call on hold as a part of causing the change in the call;
presenting the result to a user of the telecommunication device;
receiving an input from the user, and
performing the change in the call responsive to the input.

11. The method of claim 1, further comprising:
notifying, using the processor in the telecommunication device, an entity that is not a participant in the call.

12. The method of claim 1, further comprising:
determining, as a part of the evaluating, that a confidence value associated with the result is below a threshold.

13. The method of claim 1, further comprising:
determining, as a part of the evaluating, that the part of the statement is flagged as harmful to a user of the telecommunication device.

14. The method of claim 1, further comprising: initiating the saving of the data of the portion, wherein the initiating begins saving data of the call from a time prior to the statement in the call.

15. The method of claim 1, further comprising:
initiating the saving of the data of the portion, wherein the initiating begins saving data of the call from a time of a beginning of the statement in the call.

16. The method of claim 1, further comprising:
initiating the saving of the data of the portion, wherein the initiating begins saving data of the call from a time after a beginning of the statement in the call.

17. The method of claim 1, further comprising:
ending the saving at a time after the statement has been made in the call, the portion forming a discrete portion.

18. The method of claim 1, further comprising:
continuing to save the data after the statement has been made in the call, the portion forming a streaming portion.

19. The method of claim 1, wherein the pre-processing further includes one of compressing, encrypting, and encoding the data of the portion.

20. The method of claim 1, further comprising:
concluding that the statement conforms to a configured grammatical structure of a language of a conversation in the call, the detecting being responsive to the concluding.

21. The method of claim 1, wherein the method is embodied in a computer program product comprising one or more computer-readable storage devices and computer-readable program instructions which are stored on the one or more computer-readable tangible storage devices and executed by one or more processors.

22. A computer program product for verifying statements during a call that uses a telecommunication device, the computer program product comprising one or more computer-readable storage devices, and program instructions stored on at least one of the one or more storage devices, the stored program instructions comprising:
program instructions to detect, at the telecommunication device, using a processor in the telecommunication device, a statement made during the call, the statement forming an in-call fact statement;
program instructions to save data of a portion of the call, wherein the portion is related to the statement;
program instructions to pre-process the data of the portion of the call, wherein the pre-processing includes one of filtering, redacting, and masking the part of the data of the portion to remove sensitive information associated with a user of the telecommunication device;
program instructions to determine, using the processor in the telecommunication device, that textual content is present in the data of the portion of the call;
program instructions to extract, using the processor in the telecommunication device for Natural Language Processing (NLP) on the textual content, the part of the statement that is asserted as true from the pre-processed data of the portion of the call;
program instructions to receive a result of a verification of the part of the statement;
program instructions to evaluate the result to determine that the part of the statement is false;
program instructions to determine, as a part of the evaluating, that a confidence value associated with the result is greater than a threshold;
program instructions to provide, responsive to determining that the confidence value is greater than the threshold, an in-call indication to the user of the telecommunication device that the part of the statement is false, wherein the in-call indication is an in-call announcement audible only to the user; and
program instructions to cause, responsive to the evaluating, using the processor in the telecommunication device, a change to occur in the call.

23. A computer system for verifying statements during a call that uses a telecommunication device, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to detect, at the telecommunication device, using a processor in the telecommunication device, a statement made during the call, the statement forming an in-call fact statement;
program instructions to save data of a portion of the call, wherein the portion is related to the statement;

program instructions to pre-process the data of the portion of the call, wherein the pre-processing includes one of filtering, redacting, and masking the part of the data of the portion to remove sensitive information associated with a user of the telecommunication device;

program instructions to determine, using the processor in the telecommunication device, that textual content is present in the data of the portion of the call;

program instructions to extract, using the processor in the telecommunication device for Natural Language Processing (NLP) on the textual content, the part of the statement that is asserted as true from the pre-processed data of the portion of the call;

program instructions to receive a result of a verification of the part of the statement;

program instructions to evaluate the result to determine that the part of the statement is false;

program instructions to determine, as a part of the evaluating, that a confidence value associated with the result is greater than a threshold;

program instructions to provide, responsive to determining that the confidence value is greater than the threshold, an in-call indication to a user of the telecommunication device that the part of the statement is false, wherein the in-call indication is an in-call announcement audible only to the user; and program instructions to cause, responsive to the evaluating, using the processor in the telecommunication device, a change to occur in the call.

* * * * *